(12) United States Patent
Kieser et al.

(10) Patent No.: US 6,241,382 B1
(45) Date of Patent: Jun. 5, 2001

(54) METHOD FOR PRODUCING POWDER LACQUER CONTAINING GLOSS PIGMENTS

(75) Inventors: Manfred Kieser; Otto Stahlecker, both of Darmstadt (DE)

(73) Assignee: Merck Patent Gesellschaft mit beschrankter Haftung, Darmstadt (DE)

( * ) Notice: Subject to any disclaimer, the term of this patent is extended or adjusted under 35 U.S.C. 154(b) by 0 days.

(21) Appl. No.: 09/367,722
(22) PCT Filed: Feb. 11, 1998
(86) PCT No.: PCT/EP98/00741
§ 371 Date: Nov. 19, 1999
§ 102(e) Date: Nov. 19, 1999
(87) PCT Pub. No.: WO98/37154
PCT Pub. Date: Aug. 27, 1998

(30) Foreign Application Priority Data

Feb. 21, 1997 (DE) .............................................. 197 07 051

(51) Int. Cl.$^7$ ..................................................... B01F 13/05
(52) U.S. Cl. ................................................................. 366/348
(58) Field of Search ..................... 366/348, 139, 366/144, 132, 136, 151.1, 160.1, 160.2, 182.1, 182.2, 177.1; 422/150, 226; 523/340

(56) References Cited

U.S. PATENT DOCUMENTS

| | | |
|---|---|---|
| 5,304,001 * | 4/1994 | Kue et al. ............................ 366/348 |
| 5,399,597 | 3/1995 | Mandel et al. . |
| 5,505,539 * | 4/1996 | Lee et al. ............................ 366/160.2 |
| 5,749,957 | 5/1998 | Kieser et al. . |

FOREIGN PATENT DOCUMENTS

| | | |
|---|---|---|
| 716132 | 6/1996 | (EP) . |
| 9409913 | 5/1994 | (WO) . |
| 9534606 | 12/1995 | (WO) . |

* cited by examiner

Primary Examiner—Tony G. Soohoo
(74) Attorney, Agent, or Firm—Millen, White, Zelano & Branigan, P.C.

(57) ABSTRACT

A process for producing powder coating materials comprising lustre pigment comprises starting materials consisting of customary powder coating components and one or more lustre pigments. The starting materials are first introduced into the filling chamber of a first vessel which has a mixing element and is provided, if desired, with a thermostat. Subsequently, a supercritical fluid is admitted to the filling chamber, and finally the starting materials are mixed in the presence of the supercritical fluid. The mixture of the customary powder coating components, one or more lustre pigments and the supercritical fluid is transferred by a distributor into a second vessel. The distributor has a plurality of nozzles with an aperture diameter of from 0.025 cm to 2.5 cm. During transfer, the second vessel is maintained at an internal pressure of from 0 bar to 350 bar and at a temperature of from −85° C. to 200° C.

9 Claims, 1 Drawing Sheet

METHOD FOR PRODUCING POWDER LACQUER CONTAINING GLOSS PIGMENTS

Figure 1:
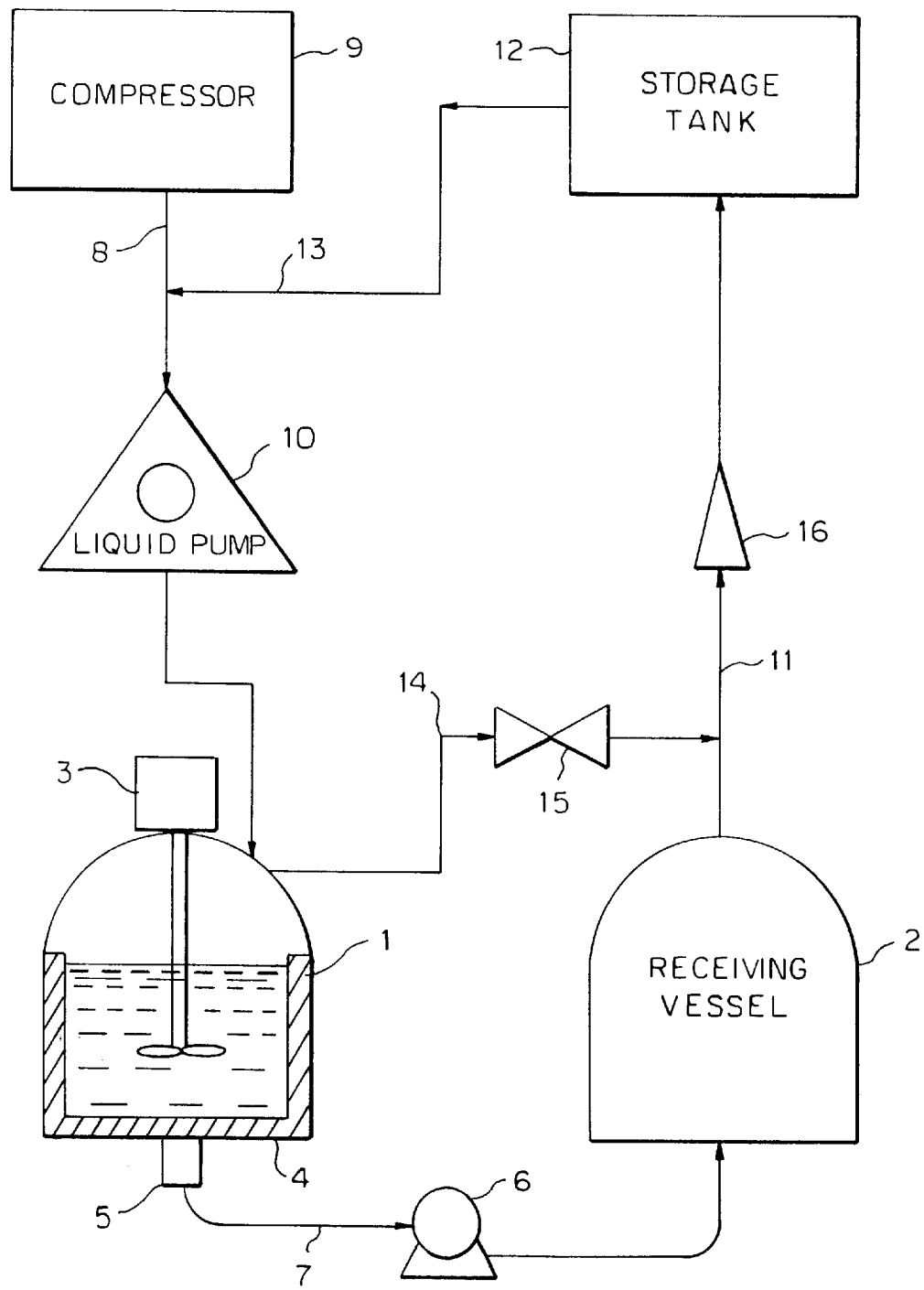

The present invention relates to a process for producing powder coating materials comprising lustre pigment.

Coatings are produced generally by applying complete coating compositions, i.e. coating systems which at the time of application contain all the necessary components, such as binders, pigments, fillers, additives, solvents, etc., of a coating.

Powder coating materials, i.e. solvent-free and eco-friendly coating systems, are usually also applied as complete, materially uniform systems. In some cases this leads to great technical problems, especially in the case of powder coating materials comprising lustre pigment.

The powder coating material is generally produced by dry mixing of the various components of the powder coating material, such as resin, curing agents, pigments, levelling agents, etc. This mixture is then fed in a suitable melt mixer in which the components are mixed in the melt at an elevated temperature. The liquid homogeneous melt material mixture produced by the extruder is converted to flake form on cooling.

The grinding process, which follows flake conversion in the case of conventional powder coating production, is suitable only for powder coating materials which do not include lustre pigments; this is because the platelet-shaped lustre pigments, during the process of grinding the flakes to powder, are mechanically destroyed, which results in reductions in gloss and in the loss of the optical properties actually desired.

In general, powder coatings are produced by applying the powder coating material, which consists of fine particles, to the substrate that is to be coated, using electrostatic powder spraying equipment—for example, by means of corona or tribo charging. The powder coating material can of course also be applied using fluidized-bed coaters.

There is therefore a great need for a simple and cost-effective process for producing powder coating materials comprising lustre pigment which exhibits little if any of the disadvantages of conventional processes.

Surprisingly, a very gentle process for producing powder coating materials comprising lustre pigment has now been found, in which the platelet form of the lustre pigments is very substantially retained and there is virtually no effect on the optical properties. The term lustre pigments as used herein embraces metallic pigments in particular and pearl lustre pigments most especially.

The invention provides a process for producing powder coating materials comprising lustre pigment, characterized in that (A) the starting materials, consisting of the customary powder coating components and one or more lustre pigments, are first of all introduced into the filling chamber of a first vessel (1) which has a mixing element (3) and is provided if desired with a thermostat (4), subsequently a supercritical fluid is admitted to the filling chamber, and finally the starting materials are mixed in the presence of the supercritical fluid and (B) the mixture of the customary powder coating components and one or more lustre pigments and the supercritical fluid is transferred by a distributor (6) into a second vessel (2), the distributor having a plurality of nozzles with an aperture diameter of from 0.0025 cm to 2.5 cm, and in the course of transfer the second vessel is maintained at an internal pressure of from 0 bar to 350 bar and at a temperature of from −85° C. to 200° C.

The invention additionally provides powder coating materials obtainable by this process which are notable for their high proportion, i.e. in particular 10–50% by weight, of lustre pigments, and provides for the use of the powder coating materials for colouring and tinting other powder coating materials by means, for example, of the dry-blend process, which is known, inter alia, from EP 0 176 132.

The process of the invention permits the simple and cost-effective production of powder coating materials comprising lustre pigment which feature a high lustre. Furthermore, the process of the invention produces powder coating materials of high flowability, frequently without the need to add flow aids; should, however, the addition of a flow aid be desired in a particular instance, the amount of flow aid required to obtain a certain level of flowability is substantially lower than for powder coating materials not produced in accordance with the invention.

For the production of the powder coating materials comprising lustre pigment, there are provided at room temperature one or more lustre pigments and the customary powder coating components with or without customary additives, a source of a supercritical fluid, a first vessel with a mixing element, and a second vessel. The lustre pigments and the customary powder coating components along with the supercritical fluid are introduced into the first vessel and a homogeneous powder coating solution/dispersion is prepared. Where the powder coating material comprising lustre pigment includes conventional pigments and fillers in addition to the lustre pigments, it is advisable first of all to disperse the customary powder coating components with the conventional pigments and/or fillers under relatively high shear conditions beforehand. Subsequently, the lustre pigments are then added, and are mixed under lower shear conditions with the powder coating components. Thereafter, the contents of the first vessel are transferred to the second vessel, which is under a lower pressure than the first vessel.

In accordance with the process of the invention, the lustre pigment component is incorporated securely into the powder coating particles. It is particularly surprising that the powder coating materials produced by the process of the invention and comprising lustre pigment exhibit a high gloss and that none of the problems otherwise common with powder coating materials comprising lustre pigment arise. A point worthy of emphasis is the ease of handling, in comparison to prior art mixing arrangements, of the mixing apparatus used in accordance with the invention, which can be operated even for small batches and can be cleaned quickly and with ease.

The proportion of the lustre pigment component in the finished powder coating material can be between 0.1 and 50% by weight, in particular between 1 and 20% by weight, based on the mass of the mixture.

The lustre pigment component can comprise commercial metal pigments in powder form, e.g. Standard® from Eckart, lustre pigments, such as Paliocrom® pigments from BASF and especially pearl lustre pigments, as are described, for example, in the German Patents and Patent Applications 14 67 468, 19 59 998, 20 09 566, 22 14 545, 22 15 191, 22 44 298, 23 12 331, 25 22 572, 31 37 808, 31 37 809, 31 51 343, 31 51 354, 31 51 355, 32 11 602, 32 35 017 and 38 42 330 and are marketed by Merck KGaA, Darmstadt under the tradename Iriodin®. Particularly preferred pearl lustre pigments are $TiO_2$/mica pigments and/or $Fe_2O_3$/mica pigments. The lustre pigment used, for example, can also be graphite, coated graphite, $TiO_2$, $SiO_2$ and $Al_2O_3$ platelets, BiOCl, chiral nematic crosslinked liquid-crystal platelets, the latter as marketed, for example, by Wacker, FRG, dielectric layer pigments, e.g. from Flex, USA, or holographic flake pigments, as known, for example, from U.S. Pat. No. 5,415,950. The lustre pigment employed can also be a mixture of the pigments stated.

Suitable powder coating components are all raw materials employed in conventional powder coating materials. Resin components are, in particular, reactive epoxies, polyesters, polyurethanes or acrylates; also suitable in principle, however, are other polymers which can be both reactive and thermoplastic. Particular preference is given to polyester systems, epoxy systems and polyester-epoxy systems.

In addition, the powder coating materials of the invention may also include further components, such as curing agents, levelling agents, flow aids, stabilizers, pigments and/or fillers, for example. Examples of further possible additives are tribo additives.

Both liquids and gases are used as supercritical fluid. The term supercritical fluid refers to a substance which under certain pressures and temperatures no longer has the properties either of a gas or of a liquid. Examples of supercritical fluids suitable for use in the present invention include $CO_2$, water, dinitrogen monoxide, methane, ethane, ethylene, propane, pentane, benzene, methanol, ethanol, isopropanol, various fluorinated hydrocarbons such as chlorotrifluoromethane and monofluoromethane, toluene, pyridine, cyclohexane, decalin, cyclohexanol, o-xylene and tetralin. These compounds can be employed either individually or as a mixture. The said compounds can also be employed together with a solvent. Examples of suitable solvents are acetone, ketones and ethers. The preferred supercritical fluid employed is $CO_2$, since it is not flammable and is also very favourably priced; it is used in the absence of a solvent.

FIG. 1 shows diagrammatically an apparatus for the production of the powder coating materials comprising lustre pigment. A similar apparatus for the production of conventional powder coating materials, i.e. powder coating materials which do not comprise lustre pigments, is known, for example, from U.S. Pat. No. 5,399,597. In the figure, (1) denotes a first pressure vessel which is connected via a line (7) to a receiving vessel (2). A gas source (9) is connected to the pressure vessel (1) via the line (8). The gas is fed into the vessel (1) preferably under pressure with a compressor or a liquid pump (10). The receiving vessel (2) is connected via a line (11) to the recycle tank (12), which in turn is connected to the gas tank via line (13).

The pressure vessel (1) preferably includes an outlet valve (5) at the bottom for emptying the filling chamber. Connected in the top region of the pressure vessel (1) is the inlet of line (14), which inlet is connected to line (11), and a control valve (15) is installed in the inlet of line (14). Line (11) comprises a compressor (16) which serves to compress and transfer gas emerging from the pressure vessel (1) or the receiving vessel (2) into the recycle tank (12). The pressure vessel (1) includes a closable access aperture through which it can be charged with materials, and a mechanical stirrer (3) form a mechanical agitation and stirring of the contents of the pressure vessel (1). The receiving vessel (2) likewise includes a closable access aperture via which it is possible to remove samples of materials present in the vessel or to discharge these materials. Preferably, the vessels (1) and (2) each have a rapid closure system which can be opened and closed without recourse to tools. In addition, the vessel (1) includes a valve construction having a supply aperture which, following the application of pressure, allows the rapid addition of small amounts of materials (e.g. additives or pigments) to the vessel (1). The vessel (2), furthermore, includes a conveying device for facilitating a rapid discharge of the materials from the vessel (2).

The pressure vessel (1) and the receiving vessel (2) consist preferably of metal, especially stainless steel, of heat- and abrasion-resistant plastics, or of ceramic, e.g. porcelain. Obviously, other materials may be considered, examples being nickel-coated carbon steel, or vessels of carbon steel with other suitable chemical inert additions or linings.

In the process of the invention, the pressure vessel (1) is first of all charged with the starting materials. Then the pressure vessel (1) is closed and isolated. Subsequently, gas from the source (9) is fed into the vessel (1) via line (8) until the desired pressure is reached. A critical temperature is obtained either by heating the vessel (1) and/or heating the liquid/gas stream on entry to the vessel (1) and, if desired, agitating the vessel (1) at the same time. At the pressure and temperature in vessel (1) the gas is transformed into a supercritical fluid. Suitable pressures here are from 20 bar to 1500 bar. When a gas such as $CO_2$ is used, a pressure of from 35 bar to 500 bar, preferably from 35 bar to 350 bar and, in particular, from 70 bar to 300 bar is employed. The particular pressure depends of course on variables such as the temperature of the vessel (1) and the particular supercritical fluid used.

Following the application of pressure to the vessel (1) the stirrer (3) is switched on and the starting materials are mixed with the supercritical fluid. At this point an internal temperature of from −85° C. to 200° C. prevails in vessel (1). When $CO_2$ is used as supercritical fluid, the temperature is from 15° C. to 160° C., preferably from 20° C. to 150° C. and, in particular, from 30° C. to 100° C. The particular temperature depends of course on a variety of variables, such as, for example, the supercritical fluid used, the composition of the starting materials, the respective pressures, and the design of the pressure vessel. The vessel (1) is preferably maintained at a temperature which lies below the melting point of the starting materials to be processed. The temperature in the vessel (1) lies preferably within the range from 5° C. below the glass transition temperature $T_G$ of at least one of the materials to be processed to about the melting point of such a material. In the case of an amorphous material, "melting point" means the temperature at which the material becomes completely liquid.

The vessel (1) is preferably equipped with heat exchangers or other suitable heating and cooling devices (4) in order to obtain the desired temperature. In this context, even in a most unfavourable case (high rotary speed of the mixing element (3), large amount of mixture) the temperature should be held constant to at least about ±2° C.

The starting materials are mixed in vessel (1) for 1–480 minutes, preferably 5–300 minutes and, in particular 30–240 minutes. The chosen mixing time can be shorter at high tip speeds, although lower tip speeds of not more than 10–25 m/s are preferred in order to disperse the lustre pigments, which are sensitive to fracture.

In the mixing apparatus used, the mixing element (3) can be designed, for example, as a paddle stirrer or dissolver disc, but may also have other, different forms. The mixing element is preferably operated at rotary speeds of between 0 and 20,000 rpm. The tip speed of the mixing element (3) can be varied within a wide range between 1–50 m/s, preferably 5–40 m/s and, in particular 10–25 m/s.

After the thorough mixing of the components employed, the valve (5) is opened and is kept open until essentially all of the starting materials originally present in the pressure vessel (1) have been transferred to the receiving vessel (2), which is held at a lower pressure than vessel (1). After that, valve (15) is opened, thereby letting down the vessel (1) and allowing gas to flow into the recycle tank (12). The gas is then passed via line (13) into line (8) and is made available for renewed use.

For the transfer of the solid materials into the receiving vessel (2), the vessel (2) is preferably held at a constant pressure which is lower than that of pressure vessel (1). Accordingly, the gas and the starting materials preferably enter the receiving vessel (2) at very high speed. The temperature prevailing in the vessel (2) is from −85° C. to 220° C., preferably from −18° C. to 160° C. and, in particular, from 0° C. to 130° C. As in the case of vessel (1), heat exchangers or other heating and cooling devices may be necessary to maintain the desired temperature in vessel (2). The vessel (2) is preferably held at a temperature which lies below the melting point of the materials to be processed. The vessel (2) is maintained at a pressure of from 0 bar to 350 bar, preferably from 5 bar to 150 bar and, in particular, from 10 bar to 150 bar. The respective pressure and the respective temperature in vessel (2) depend of course in turn on different variables: for example, the particular gas used, the composition of the starting materials and the design of the devices.

Situated in line (7) directly upstream of the receiving vessel (2) is preferably a distributor (6) having a plurality of nozzles through which the gas and/or the supercritical fluid and the starting materials are sprayed. Any desired number of nozzles are suitable for spraying the powder coating material comprising lustre pigment. The choice of correct nozzle depends of course on a variety of parameters such as, for example, the pressures prevailing in vessel (1), the desired particle size, the throughputs, the materials to be processed, and the supercritical fluid which is used.

The spraying nozzles have aperture widths of from 0.0025 cm to 2.5 cm, preferably from 0.0125 cm to 1.25 cm and, in particular, from 0.025 cm to about 0.25 cm. The stirrer (3) comprises an electric motor which drives a mixer. The mixer can include as many conventional mixing devices as is desired. The choice of correct mixer depends of course on a variety of parameters, such as, for example, the size of the motor, the components to be mixed, the design of the vessel (1), the fluid that is used, and the pressures prevailing in vessel (1).

When $CO_2$ is used as supercritical fluid it is preferably fed into the vessel (1) or inserted therein such that there is about 10–90% by weight $CO_2$ and 90–10% by weight starting materials, preferably 15–85% by weight $CO_2$ and 85–15% by weight starting material and, in particular, 20–80% by weight $CO_2$ and 80–20% by weight starting materials.

Following the transfer and spraying of the powder coating solution in vessel (2), the lustre pigment particles are fixed in the powder coating particles and are thus homogeneously distributed within the coating powder grain.

In accordance with the process of the invention it is also possible to produce powder coating concentrates comprising lustre pigments; that is, powder coating materials having a very high concentration of lustre pigments. The weight fraction of lustre pigments can in this case be up to 50% by weight, preferably up to 25% by weight. These powder coating materials with a high level of lustre pigmentation can be used in small amounts to colour or tint other powder coating materials. In the course of the application process, however, it is impossible to rule out separation phenomena. This separation leads to changes in the processing properties and in the optical properties of the coating. The separation problems can be solved by adding conductive pigments. A process to this effect is known, for example, from EP 0 716 132. Within the field of powder coating materials with lustre pigmentation, therefore, a more flexible, more extensive tinting possibility is provided. In addition, it is also possible to realise additional effects such as spatter effects and hammer finish effects. The powder coating concentrates can also be referred to as pulverulent masterbatches and given a suitable choice of binder can be used for colouring plastics, especially thermoplastics.

The process of the invention is therefore of considerable economic importance.

The example which follows is intended to illustrate the invention although without limiting it.

EXAMPLE

A stainless steel pressure vessel (1) having a capacity of 100 l is charged with a mixture of the following starting materials:

| | |
|---|---|
| Polyester resin (Uralac 2400, DSM) | 88.0% by weight |
| Crosslinker (Araldit PT 800, Ciba) | 6.5% by weight |
| Levelling agent (Acronal 4F, BASF) | 0.5% by weight |
| Benzoin | 0.5% by weight |
| Iriodin ® 9103 WR ($TiO_2$/mica pigment with a particle size of 10–40 μm from Merck KGaA) | 4.5% by weight |

The pressure vessel (1) is then filled with $CO_2$ to a pressure of 200 bar (80° C.), as a result of which the $CO_2$ becomes a supercritical fluid. Starting material is inserted into the vessel (1) such that the latter contains 70% by weight $CO_2$ and 30% by weight of starting material. After the vessel (1) has been isolated the individual components and the supercritical fluid are mixed for about 60 minutes using stirrer (3). The vessel (1) is adjusted to a temperature of about 80° C. using a conventional heating and cooling regulator system (4).

After the starting materials have been mixed to form a homogeneous product, the valve (5) is opened and the homogeneous product is sprayed by way of the distributor (6) into the receiving vessel (2). This vessel is a stainless steel vessel having a capacity of 500 l. The receiving vessel (2) is maintained at a dynamic pressure of about 20 bar. The line (7) has an internal diameter of about 2.5 cm. The distributor comprises six separate nozzles arranged in parallel. These are hydraulic atomizer nozzles having aperture widths of 0.05 cm. After the homogeneously pigmented powder coating material has been completely transferred to the receiving vessel (2), the latter is let down fully, with the $CO_2$ being transferred to the storage tank (12) for renewed use. The pressure vessel (1) is at this point also ready for renewed use. Subsequently, the receiving vessel (2) is let down via line (11) and compressor (9) and the $CO_2$ present in vessel (2) is transferred into the storage tank (12) for renewed use. Thereafter, the receiving vessel (2) is opened and the homogeneous product is discharged in powder form.

What is claimed is:

1. Process for producing powder coating materials comprising lustre pigment, characterized in that
    (A) the starting materials, consisting of the customary powder coating components and one or more lustre pigments, are first of all introduced into the filling chamber of a first vessel (1) which has a mixing element (3) and is provided if desired with a thermostat (4), subsequently a supercritical fluid is admitted to the filling chamber, and finally the starting materials are mixed in the presence of the supercritical fluid and (B) the mixture of the customary powder coating components and one or more lustre pigments and the supercritical fluid is transferred by a distributor (6) into a second vessel (2), the distributor having a plurality of nozzles with an aperture diameter of from 0.025 cm to 2.5 cm, and in the course of transfer the second vessel is maintained at an internal pressure of from 0 bar to 350 bar and at a temperature of from −85° C. to 200° C.

2. Process according to claim 1, characterized in that the mixing element (3) is designed as a paddle stirrer or dissolver disc.

3. Process according to claim 1, characterized in that the tip speed of the mixing element (3) during mixing is 1–50 m/s.

4. Process according to one of claim 1, characterized in that lustre pigment is a pearl lustre pigment and/or a metallic pigment.

5. Process according to claim 4, characterized in that the pearl lustre pigment is a $TiO_2$ mica pigment and/or an $Fe_2O_3$/mica pigment.

6. Process according to claim 1, characterized in that the proportion of the lustre pigment in the powder coating material is from 0.1 to 50% by weight.

7. Process according to claim 1, characterized in that the supercritical fluid is $CO_2$.

8. Powder coating material comprising lustre pigment, produced by the process according to claim 1.

9. Use of the powder coating materials comprising lustre pigment, produced by the process according to claim 1, for colouring and tinting other powder coating materials and plastics.

* * * * *